(12) United States Patent
Zhang et al.

(10) Patent No.: US 8,335,944 B2
(45) Date of Patent: Dec. 18, 2012

(54) AUTOMATIC TESTING APPARATUS

(75) Inventors: Chuanguo Zhang, Taipei Hsien (TW); Yuxi Chen, Taipei Hsien (TW); Shiping Wu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 251 days.

(21) Appl. No.: 12/701,828

(22) Filed: Feb. 8, 2010

(65) Prior Publication Data
US 2011/0022892 A1   Jan. 27, 2011

(30) Foreign Application Priority Data

Jul. 21, 2009 (CN) .......................... 2009 1 0157998

(51) Int. Cl.
*G06F 11/00* (2006.01)
(52) U.S. Cl. ............................. 714/28; 714/37; 714/38.1
(58) Field of Classification Search ...................... 714/30
See application file for complete search history.

(56) References Cited

U.S. PATENT DOCUMENTS

| | | | | |
|---|---|---|---|---|
| 4,718,064 A | * | 1/1988 | Edwards et al. ................. | 714/28 |
| 5,359,546 A | * | 10/1994 | Hayes et al. .................... | 702/123 |
| 5,796,847 A | * | 8/1998 | Kaihotsu et al. ................ | 381/57 |
| 7,375,543 B2 | * | 5/2008 | Ito et al. ....................... | 324/750.3 |
| 7,990,418 B2 | * | 8/2011 | Liu ................................ | 348/180 |
| 2004/0131194 A1 | * | 7/2004 | Gruhle et al. .................. | 381/59 |
| 2005/0256658 A1 | * | 11/2005 | Anderson ....................... | 702/90 |
| 2007/0018670 A1 | * | 1/2007 | Ito et al. ........................ | 324/765 |
| 2007/0157274 A1 | * | 7/2007 | Chiu .............................. | 725/107 |
| 2007/0214428 A1 | * | 9/2007 | Krampitz et al. .............. | 715/771 |
| 2007/0271059 A1 | * | 11/2007 | Vonstaudt ...................... | 702/119 |
| 2007/0278862 A1 | * | 12/2007 | Lin ................................ | 307/131 |
| 2008/0036865 A1 | * | 2/2008 | Liu ................................ | 348/180 |
| 2008/0100328 A1 | * | 5/2008 | Dhong et al. .................. | 324/765 |
| 2008/0221824 A1 | * | 9/2008 | Kumaki ......................... | 702/118 |
| 2008/0262759 A1 | * | 10/2008 | Bosl et al. ...................... | 702/58 |
| 2008/0294359 A1 | * | 11/2008 | Wissman ........................ | 702/65 |
| 2010/0023294 A1 | * | 1/2010 | Fan et al. ....................... | 702/123 |
| 2010/0332569 A1 | * | 12/2010 | Bryant-Rich et al. ........ | 707/912 |
| 2011/0019107 A1 | * | 1/2011 | Lowe et al. .................... | 348/738 |
| 2011/0107074 A1 | * | 5/2011 | Chan et al. ..................... | 713/2 |
| 2011/0145645 A1 | * | 6/2011 | Volkerink et al. .............. | 714/35 |

FOREIGN PATENT DOCUMENTS

CN          101118264           2/2008

OTHER PUBLICATIONS

Office Action issued by CIPO on Mar. 30, 2012, for Application No. 200910157998.5 titled "Automatic Testing Apparatus".

* cited by examiner

*Primary Examiner* — Kamini Patel
(74) *Attorney, Agent, or Firm* — Ming Chow; Sinorica, LLC

(57) ABSTRACT

The present invention relates to an automatic testing apparatus, which comprises a device under test and a testing module. The device under test has a testing program and includes a plurality of functional modules. The testing module is coupled to the device under test. The device under test executes a testing program and communicates with the testing module so that the testing module can test the plurality of functional modules of the device under test. By adopting automatic testing, no tester is needed for performing testing. Thereby, the personnel cost can be reduced and the total testing time can be shortened.

38 Claims, 13 Drawing Sheets

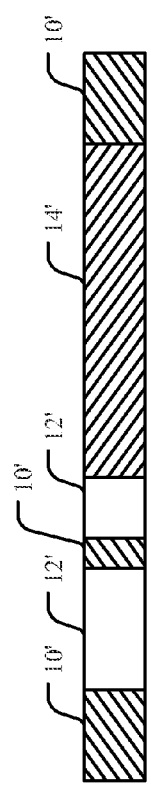
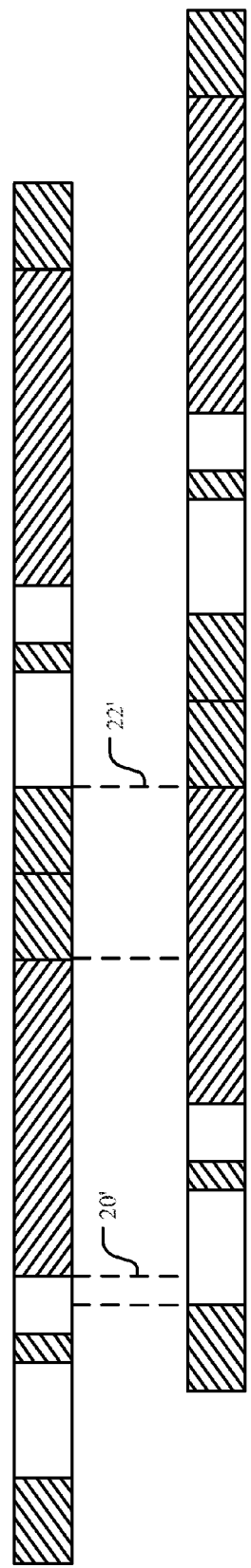
Figure 1A
Figure 1B

AUTOMATIC TESTING APPARATUS

FIELD OF THE INVENTION

The present invention relates to a testing apparatus, and particularly to an automatic testing apparatus.

BACKGROUND OF THE INVENTION

Owing to rapid technological development and industrial progress, the market led by the semiconductor industry and the information and electronic industry keeps growing prosperously, and thus bringing apparent changes in many applications. They not only bring about technological achievements, but also improve people's quality of life and alter lifestyle. The influenced technological products include thousands of electronic consumer products such as personal computers, mice, scanners, mobile phones, and personal digital assistants. In particular, such products have developed from professional equipments to personal, domestic, and daily consumer products. In other words, people rely on these devices increasingly. All manufacturers are devoted to producing more related products as well as improving productivity.

In addition, computer manufacturers have developed and fabricated a computer-platform product, for example, a computer motherboard or a computer expansion card, which usually needs to be tested using a testing program prior to launching to the market for testing if the computer-platform product can operate normally and completely. During the testing process, if any device or circuit is found to be defective and cannot function normally, it will be recorded as a defect point and will be forwarded to the R&D department for improvement.

For ensuring the quality of the manufactured products from the production line of computer hardware, such as servers or notebook computers, in the current IT industry, it is required to qualify each of the respective peripheral hardware used in a computer product. The general testing method in the production line of a factory is to test the computer or its peripherals in a primitive way. That is to say, testing is performed manually by operators in the factory. For example, manually switch the switches or buttons; or judge by the operator using his eyes or ears. Some problems occur when testing manually. Inconvenience in testing, long manual operating time, and fatigue of the operators will all affect the testing result.

FIGS. 1A and 1B show schematic diagrams of a cycle for testing a computer motherboard and of cycles for testing two computer motherboards simultaneously according to the prior art. As shown in the figures, a testing cycle by which a tester performs generally includes a manual testing cycle 10', an automatic testing cycle by program 12', and an alternate manual and automatic testing cycle 14'. For enhancing testing efficiency, testers are required by managers to test multiple computer motherboards simultaneously. Here, two computer motherboards tested simultaneously are used as an example shown in FIG. 1B. While testing a computer motherboard, manual, automatic, and alternate manual and automatic tests are performed. Thereby, while performing the automatic testing cycle on two computer motherboards, a manual idle cycle 20' occurs. While performing the manual test on one of the two computer motherboards and the alternate manual and automatic test on the other, a program idle cycle 22' occurs. Consequently, the total testing time is increased, and thus the testing efficiency is reduced. When the tester tests multiple computer motherboards simultaneously, the influence becomes severer.

Accordingly, for solving the problems described above, a novel automatic testing apparatus which can avoid increases in testing time owing to manual tests on computers or computer peripherals, in testing errors, and in personnel cost is required.

SUMMARY

An objective of the present invention is to provide an automatic testing apparatus, which can perform automatic testing without testers, and hence the personnel cost is reduced.

Another objective of the present invention is to provide an automatic testing apparatus, which can perform automatic testing, and hence the testing time is shortened.

Still another objective of the present invention is to provide an automatic testing apparatus, which can perform automatic testing using a testing module, and hence man-made errors can be avoided.

The automatic testing apparatus according to the present invention comprises a device under test and a testing module. The device under test has a testing program, and includes a plurality of functional modules. The testing module is coupled to the device under test, and tests the plurality of functional modules of the device under test sequentially. The device under test executes the testing program and communicates with the testing module. The testing module tests the plurality of functional modules of the device under test. Thereby, according to the present invention, testing is performed automatically without testers, and hence the personnel cost and the testing time can be reduced. Beside, the testing module tests automatically the plurality of functional modules of the device under test. Accordingly, man-made errors can be avoided.

BRIEF DESCRIPTION OF THE DRAWINGS

FIG. 1A shows a schematic diagram of a cycle for testing a computer motherboard according to the prior art;

FIG. 1B shows a schematic diagram of cycles for testing two computer motherboards simultaneously according to the prior art;

DETAILED DESCRIPTION

In order to make the structure and characteristics as well as the effectiveness of the present invention to be further understood and recognized, the detailed description of the present invention is provided as follows along with embodiments and accompanying figures.

Figure 2:
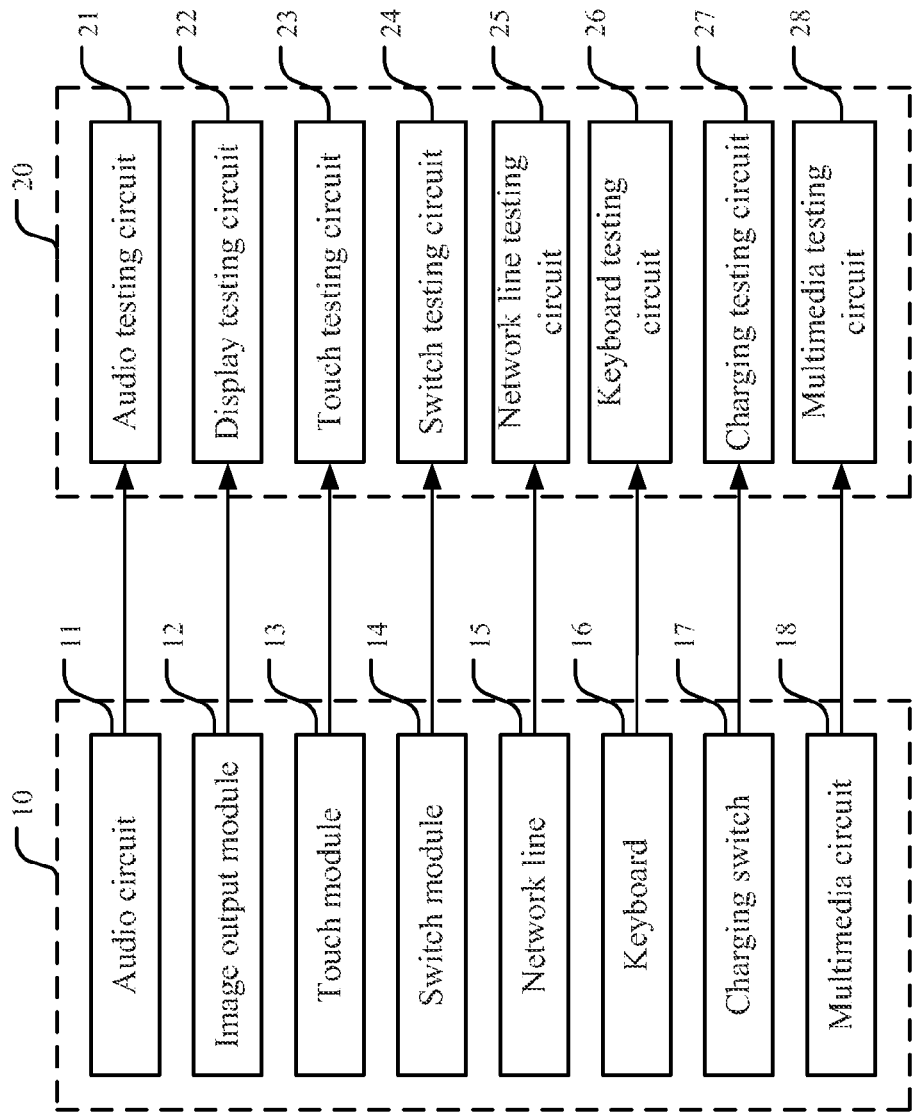
FIG. 2 shows a block diagram according to a preferred embodiment of the present invention.

FIG. 2 shows a block diagram according to a preferred embodiment of the present invention. As shown in the figure, the automatic testing apparatus according to the present invention comprises a device under test 10 and a testing module 20. The device under test 10 has a testing program, and includes a plurality of functional modules. The testing module 20 is coupled to the device under test 10, and tests the plurality of functional modules of the device under test 10. The device under test 10 executes the testing program and communicates with the testing module 20. The testing module 20 tests the plurality of functional modules of the device under test 10. Namely, the testing module 20 tests the plurality of functional modules of the device under test 10 by means of executing the testing program by the device under test 10. Thereby, the objective of automatic testing can be achieved without testers, and thus reducing personnel cost. A preferred embodiment of the device under test 10 according to the present invention is a motherboard of a computer system.

Figure 3:
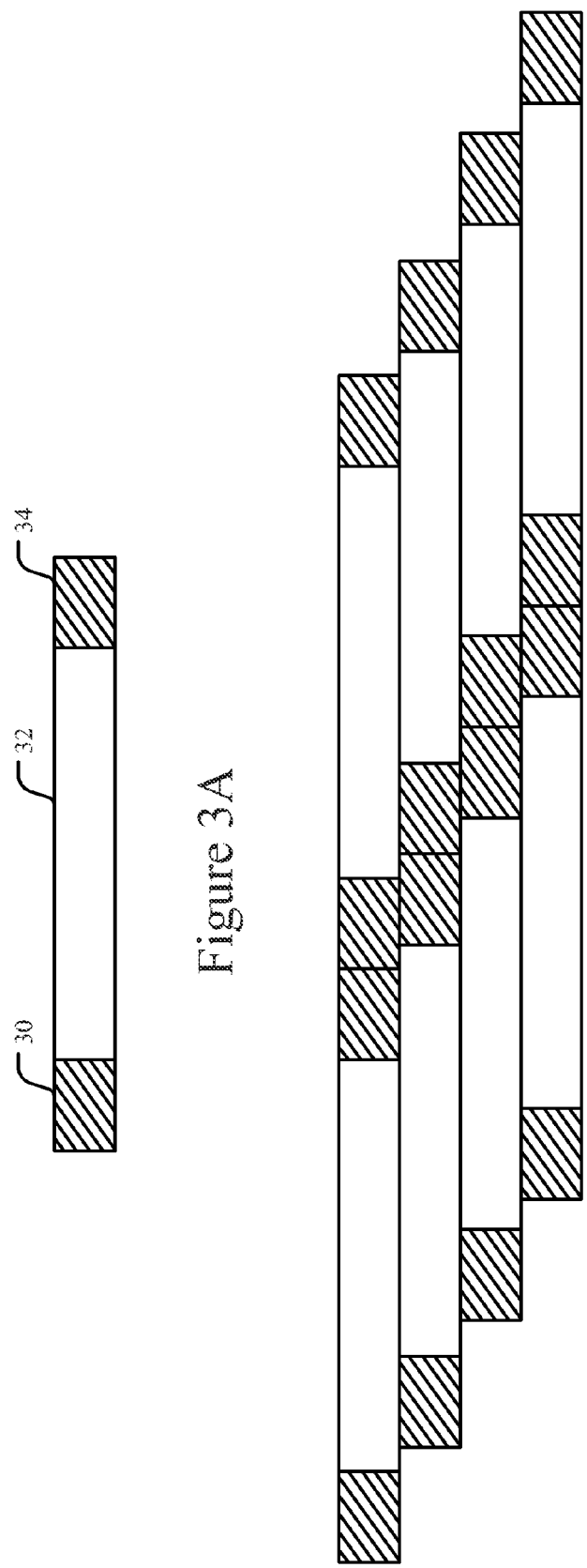
FIG. 3A shows a schematic diagram of a cycle for testing a computer motherboard according to a preferred embodiment of the present invention.
FIG. 3B shows a schematic diagram of cycles for testing four computer motherboards simultaneously according to a preferred embodiment of the present invention.

FIGS. 3A and 3B show schematic diagrams of a cycle for testing a computer motherboard and of cycles for testing four computer motherboards simultaneously according to a preferred embodiment of the present invention. As shown in the figures, the cycles of the automatic testing apparatus according to the present invention during testing a computer motherboard includes an installation cycle for testing fixtures 30, an automatic testing cycle by program 32, and an uninstallation cycle for testing fixtures 34. As shown in FIG. 3B, testers can test a plurality of computer motherboards sequentially without program or manual idle cycles. Thereby, by means of automatic testing, the total testing time can be shortened and the testing efficiency can be enhanced.

Refer back to FIG. 2. The testing module 20 according to the present invention tests the plurality of functional modules of the device under test 10. According to the present preferred embodiment, the testing module 20 tests the plurality of peripherals of a computer. Thereby, the testing module 20 comprises an audio testing circuit 21, a display testing circuit 22, a touch testing circuit 23, a switch testing circuit 24, a network line testing circuit 25, a keyboard testing circuit 26, a charge/discharge testing circuit 27, and a multimedia testing circuit 28 for coupling to an audio circuit 11, an image output module 12, a touch module 13, a switch module 14, a network line 15, a keyboard 16, a charging switch 17, and a multimedia circuit 18, respectively, and performing tests.

In addition, the device under test 10 according to the present invention uses its own image signal as an indicating signal. That is to say, testers use a red image signal, a green image signal, and a blue image signal of the image signals as an indicator. By the message of the indicator, the test the testing module 20 is performing is known. The device under test 10 executes the testing program and displays the currently performing test by the indicator of its own red, green, and blue signals. Besides, the testing module 10 corresponds to the plurality of image signals and tests one of the functional modules of the device under test 10. In the following, different testing circuits will be described in detail.

Figure 4:
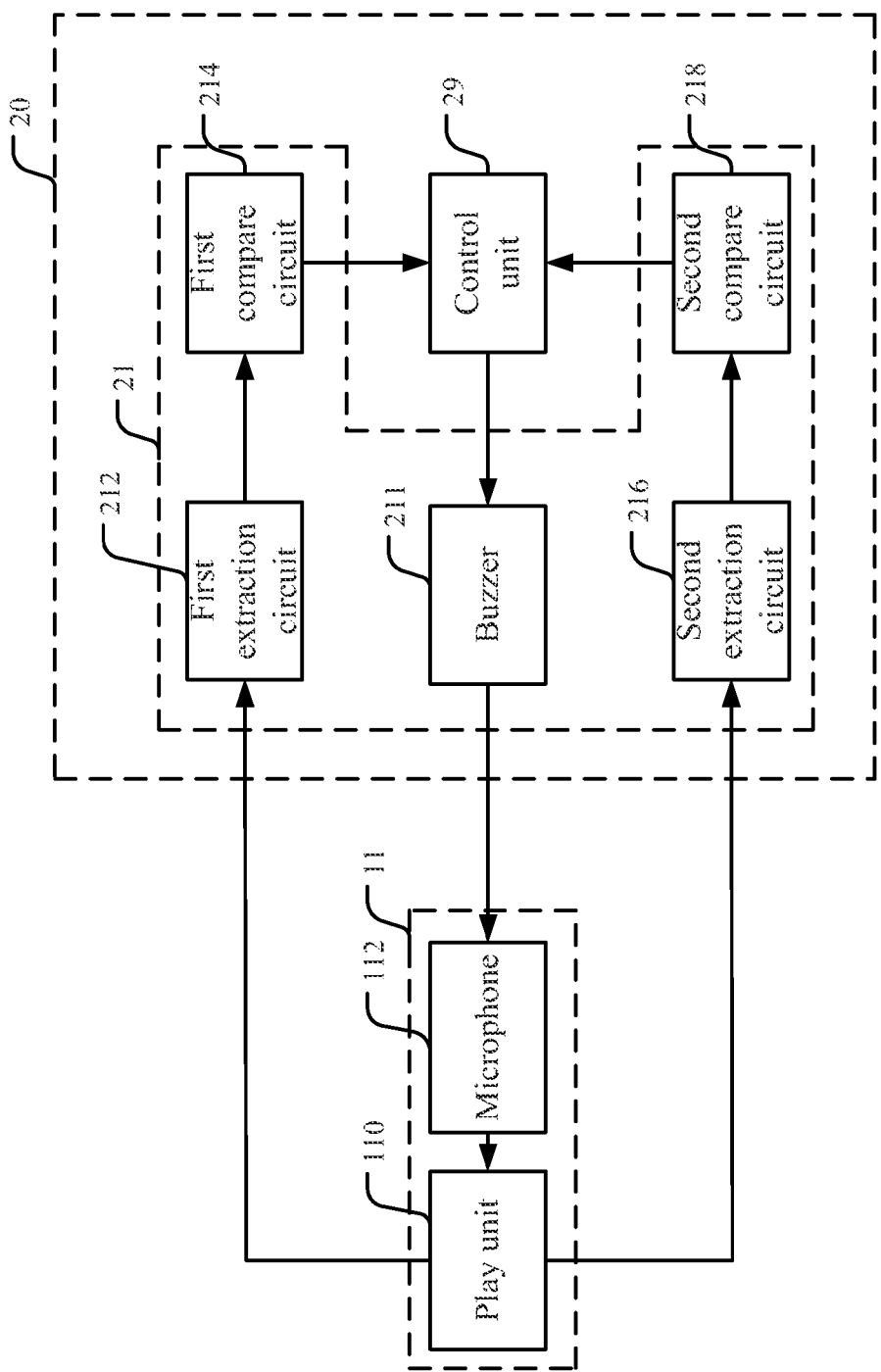
FIG. 4 shows a block diagram of audio testing according to a preferred embodiment of the present invention.

FIG. 4 shows a block diagram of audio testing according to a preferred embodiment of the present invention. As shown in the figure, the testing module 20 according to the present invention includes a control unit 29 and an audio testing circuit 21. The control unit 29 receives a testing signal produced by the testing program executed by the device under test 10, and produces a control signal. The audio testing circuit 21 receives the control signal and produces a sound signal. In other words, a buzzer 211 of the audio testing circuit 21 produces the sound signal. A play unit 110 of the audio circuit 11 of the plurality of functional modules plays the sound signal. Namely, the device under test 10 receives the sound signal produced by the audio testing circuit 21, and the play unit 110 of the audio circuit 11 plays the sound signal received by the device under test 10. The audio testing circuit 21 receives the sound signal played by the play unit 110 for testing if the sound signal played by the audio testing circuit 21 is the same as the sound signal played by the play unit 110, and hence producing an output signal. The audio testing circuit 21 transmits the output signal to the device under test 10 for judging if the play unit 110 is normal or not. Moreover, the play unit 110 is a speaker.

Additionally, the audio circuit 11 of the device under test 10 further includes a microphone 112, which receives the sound signal played by the audio testing circuit 21, and transmits the sound signal to the play unit 110 for playing the sound signal by the play unit 110 to the audio testing circuit 21. Thereby, audio testing can be performed.

Figure 5:
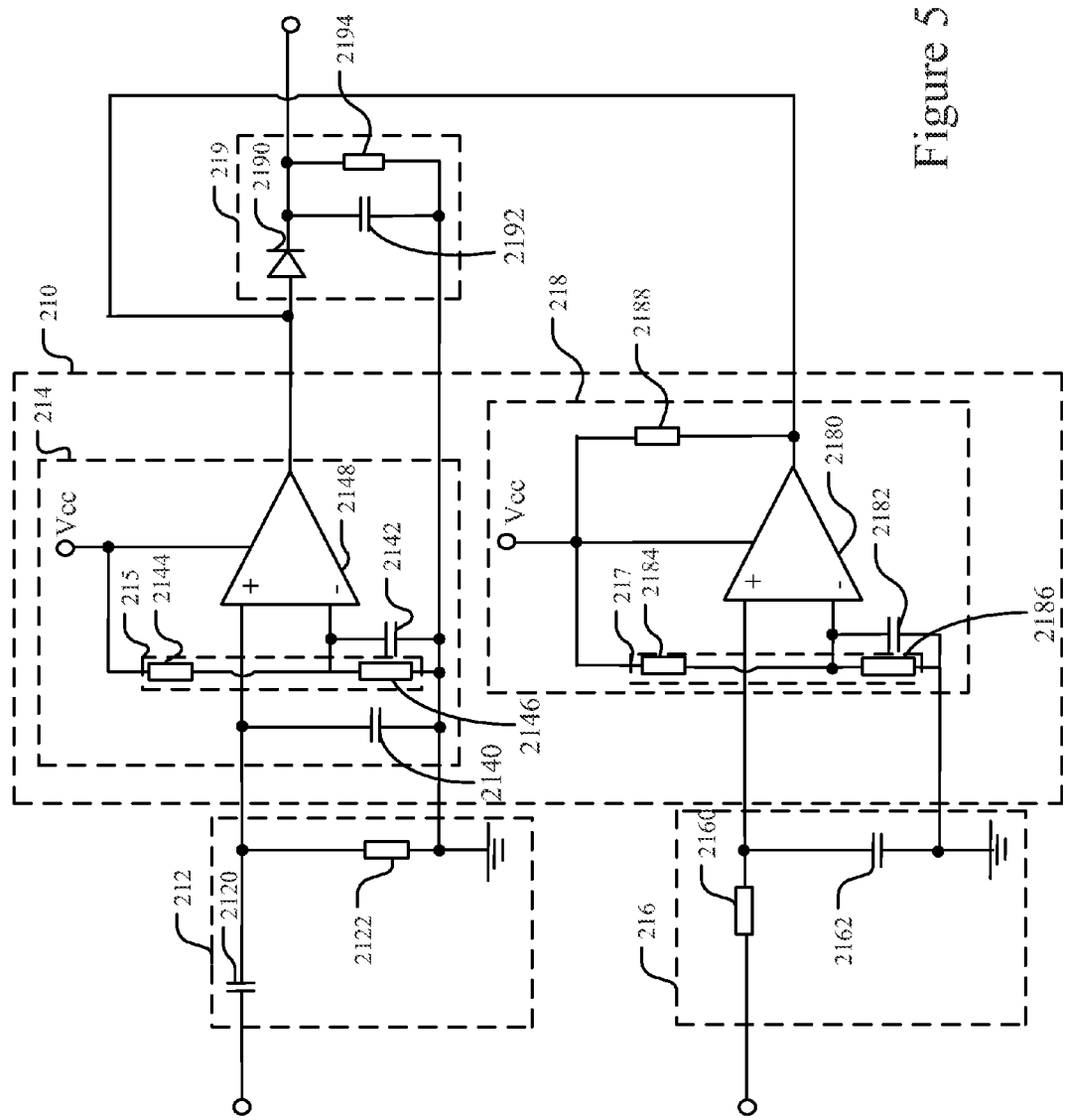
FIG. 5 shows a circuit diagram of an audio testing circuit according to a preferred embodiment of the present invention.

FIG. 5 shows a circuit diagram of an audio testing circuit according to a preferred embodiment of the present invention. As shown in the figure, the audio testing circuit 21 according to the present invention includes a compare module 210, which compares a threshold value and the sound signal played by the play unit 110 for performing audio testing. Besides, because a sound signal is a waveform composed by superposing an alternating-current (AC) signal to a direct-current (DC) signal, where the AC signal is the real sound signal and the DC signal is a baseline signal, the audio testing circuit 21 according to the present invention tests the AC signal and the DC signal of the sound signal individually for increasing testing accuracy.

The compare module 210 includes a first extraction circuit 212, a first compare circuit 214, a second extraction circuit 216, and a second compare circuit 218. The first extraction circuit 212 is used for extracting an AC signal of the sound signal. The first compare circuit 214 receives the AC signal, compares an AC threshold value of the threshold value and the AC signal, and produces a first compare signal. The first extraction circuit 212 includes a capacitor 2120 and a resistor 2122. One terminal of the capacitor 2120 receives the sound signal; one terminal of the resistor 2122 is coupled to the other terminal of the capacitor 2120; the other terminal of the resistor 2122 is coupled to the ground. Thereby, the first extraction circuit 212 extracts the AC signal of the sound signal by means of the capacitor 2120 and the resistor 2122. The first compare circuit 214 includes capacitors 2140, 2142, resistors 2144, 2146, and a compare unit 2148. The capacitor 2140 is coupled between the first extraction circuit 212 and the ground, and is coupled to a positive input terminal of the compare unit 2148. The capacitor 2142 is coupled between a negative input terminal of the compare unit 2148 and the ground. One terminal of the resistor 2144 is coupled to the power supply and the other terminal thereof is connected in series with one terminal of the resistor 2146. The other terminal of the resistor 2146 is coupled to the ground. The first compare circuit 214 forms an AC generating circuit 215. The voltage-dividing resistors 2144, 2146 are used for producing the AC threshold value. The compare unit 2148 compares the AC threshold value and the AC signal to produce the first compare signal.

The second extraction circuit 216 extracts a DC signal of the sound signal. The second compare circuit 218 receives the DC signal, compares a DC threshold value of the threshold value and the DC signal, and produces a second compare signal. The second extraction circuit 216 includes a resistor 2160 and a capacitor 2162. One terminal of the resistor 2160 receives the sound signal and the other terminal thereof is coupled to the capacitor 2162, which is coupled between the resistor 2160 and the ground. Thereby, the second extraction circuit 216 extracts the DC signal of the sound signal by means of the resistor 2160 and the capacitor 2162. The second compare circuit 218 includes a compare unit 2180, a capacitor 2182, and resistors 2184, 2186, 2188. A positive input terminal of the compare unit 2180 receives the DC signal. The capacitor 2182 is coupled between the negative input terminal of the compare unit 2180 and the ground. One terminal of the resistor 2184 is coupled to the power supply, and the other terminal thereof is coupled to the resistor 2186 and a negative input terminal of the compare unit 2180. The resistor 2186 is coupled between the negative input terminal of the compare unit 2186 and the ground. The resistor 2186 is coupled to the power supply and an output terminal of the compare unit 2180. Thereby, resistors 2184, 2186 form a DC generating circuit 217. The voltage-dividing resistors 2184, 2186 are used for producing the DC threshold value. The compare unit 2180 produces the second compare signal according to the DC threshold value.

The compare module 210 produces an output signal in accordance with the first and second compare signals for judging if the play unit 110 and the microphone 112 of the audio circuit 11 operate normally. The output terminal of the first compare circuit 214 is coupled to the output terminal of the second compare unit 218, which is equivalent to coupling the input terminals of an AND gate to the output terminals of the first and second compare units 214, 218 for producing the output signal. Besides, the audio testing circuit 21 further includes a rectifying and filtering circuit 219, which is coupled to the output terminals of the first and second compare units 214, 218 for rectifying and filtering the output signal. The rectifying and filtering circuit 219 includes a rectifier 2190, a capacitor 2192, and a resistor 2194. A positive terminal of the rectifier 2190 receives the output signal of the compare module 210. The capacitor 2192 is coupled between a negative terminal of the rectifier 2190 and the ground. The resistor 2194 is connected in parallel with the capacitor 2192.

Additionally, the audio testing circuit 21 according to the present invention can receive the sound signal produced by the microphone 112 of the audio circuit 11 of the device under test 10 when the microphone 112 receives the sound signal produced by the buzzer 211. The compare module 210 of the audio testing circuit 21 can further test the sound signal received by the microphone 112 for testing if the microphone operates normally.

Figure 6:
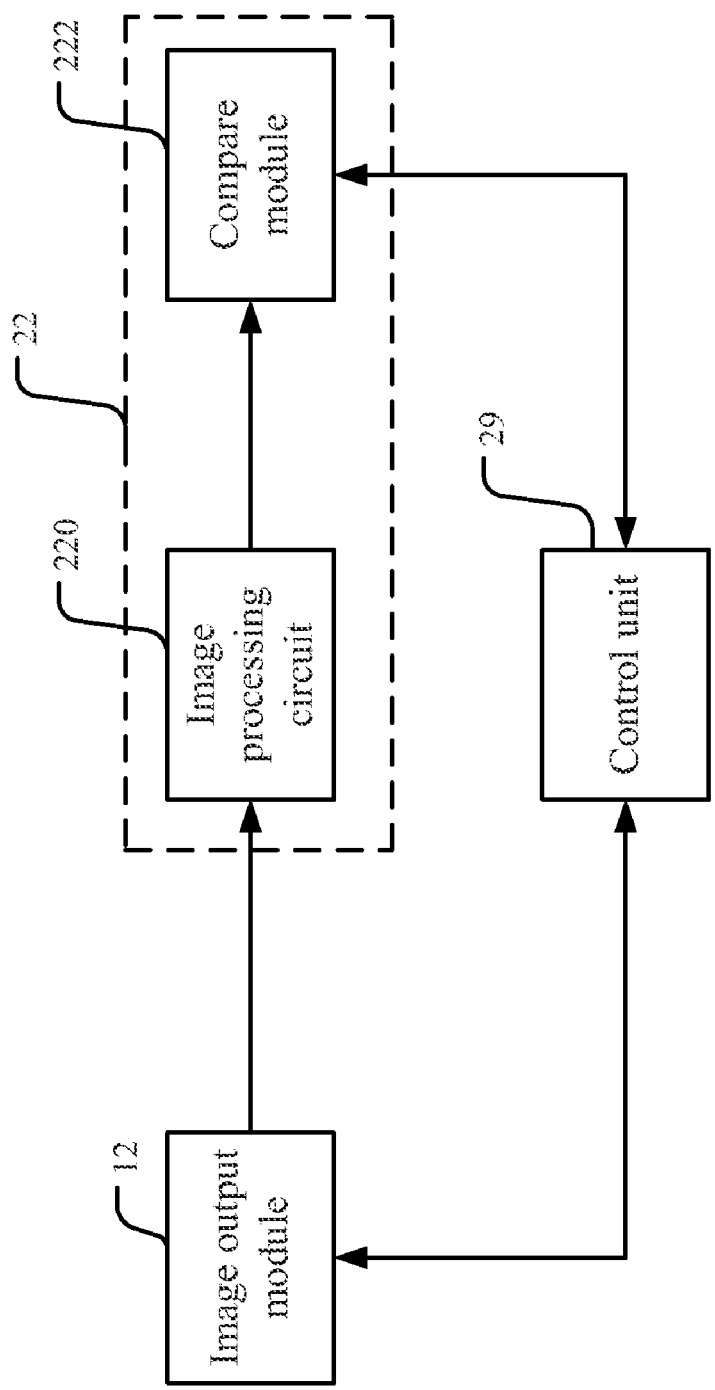
FIG. 6 shows a block diagram of display testing according to a preferred embodiment of the present invention.

FIG. 6 shows a block diagram of display testing according to a preferred embodiment of the present invention. As shown in the figure, the difference between the present preferred embodiment and the one in FIG. 4 is that, according to the present preferred embodiment, the control unit 29 receives the testing signal produced by device under test 10 while executing the testing program, and produces the control signal to drive the display testing circuit 22 of the testing module 22 to test the display. The display testing circuit 22 receives the control signal and test the image output module 12 of the device under test 10. The image output module 12 produces an image signal for performing image testing on the image output module 12 by the display testing circuit 22. The image output module 12 is a Digital Video Interface (DVI) or a High-Definition Digital Multimedia Interface (HDMI). The display testing circuit 22 includes an image processing circuit 220 and a compare module 222. The image processing circuit 220 receives the image signal, and amplifies and outputs the image signal. The compare module 222 receives the amplified image signal, compares a threshold value with the image signal, and produces an output signal for judging if the output module operates normally. The image signal includes a red image signal, a green image signal, and a blur image signal.

Figure 7:
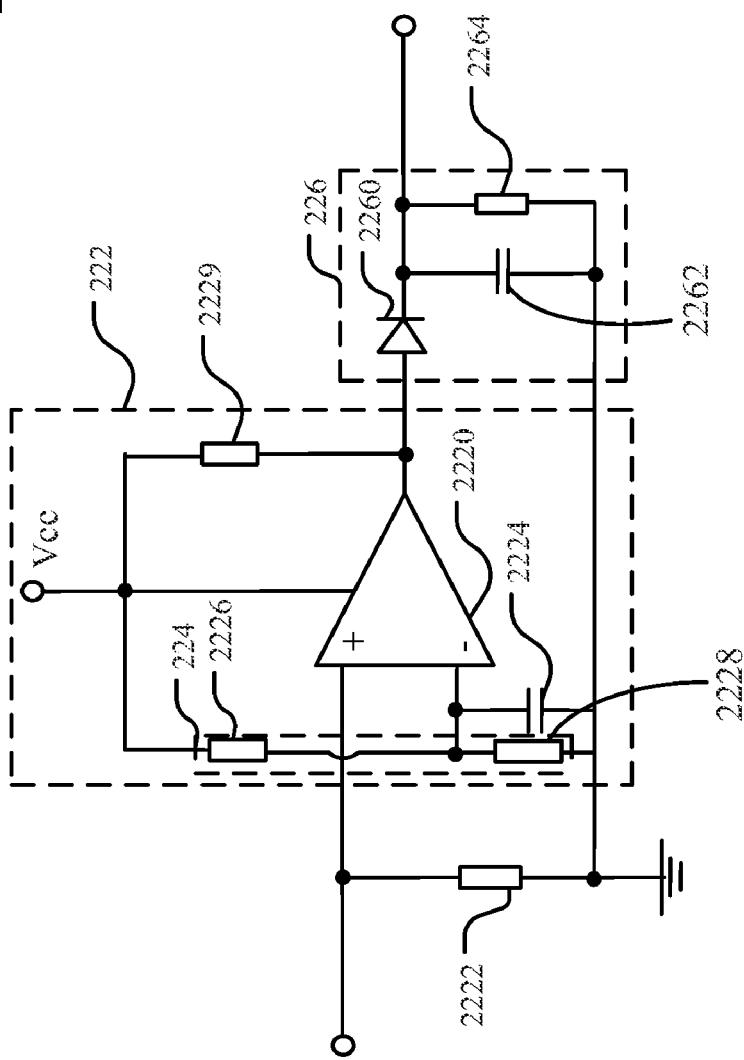
FIG. 7 shows a circuit diagram of a display testing circuit according to a preferred embodiment of the present invention.

FIG. 7 shows a circuit diagram of a display testing circuit according to a preferred embodiment of the present invention. As shown in the figure, the compare module 222 of the display testing circuit 22 includes a compare unit 2220, a capacitor 2224, and resistors 2222, 2226, 2228, 2229. A positive input terminal of the compare unit 2220 receives the red image signal of the image signal. The resistor 2222 is coupled between the positive input terminal of the compare unit 2220 and the ground. The capacitor 2224 is coupled between a negative input terminal of the compare unit 2220 and the ground. One terminal of the resistor 2226 is coupled to the power supply with the other terminal thereof coupled to a terminal of the resistor 2228. The other terminal of the resistor 2228 us coupled to the ground for forming a threshold-value generating circuit 224 via the resistors 2226, 2228 and giving the threshold value by voltage division. The resistor 2229 is coupled to the power supply and an output terminal of the compare unit 2220. The compare unit 2220 compares the threshold value with the red image signal of the image signal for judging by the device under test 10 if the image output module 12 operates normally. Besides, the display testing circuit 22 further includes a rectifying and filtering circuit 226 used for rectifying and filtering the output signal. The rectifying and filtering circuit 226 includes a rectifier 260, a capacitor 2262, and a resistor 2264. A positive terminal of the rectifier 2260 receives the output signal of the compare unit 2220. The capacitor 2262 is coupled between a negative terminal of the rectifier 2260 and the ground. The resistor 2264 is connected in parallel with the capacitor 2262.

Because the testing circuits for the green and blue image signals are the same as the one for the red image signal, they will not be described in detail. In addition, according to the present invention, red, green, and blue image signals are used as control indicators. Thereby, by judging if the indicator is the same as the controlled testing item, it is known if the output module 12 operates normally without the need of disposing the display testing circuit 22. Accordingly, the circuit area is reduced and hence the cost is saved.

Figure 8:
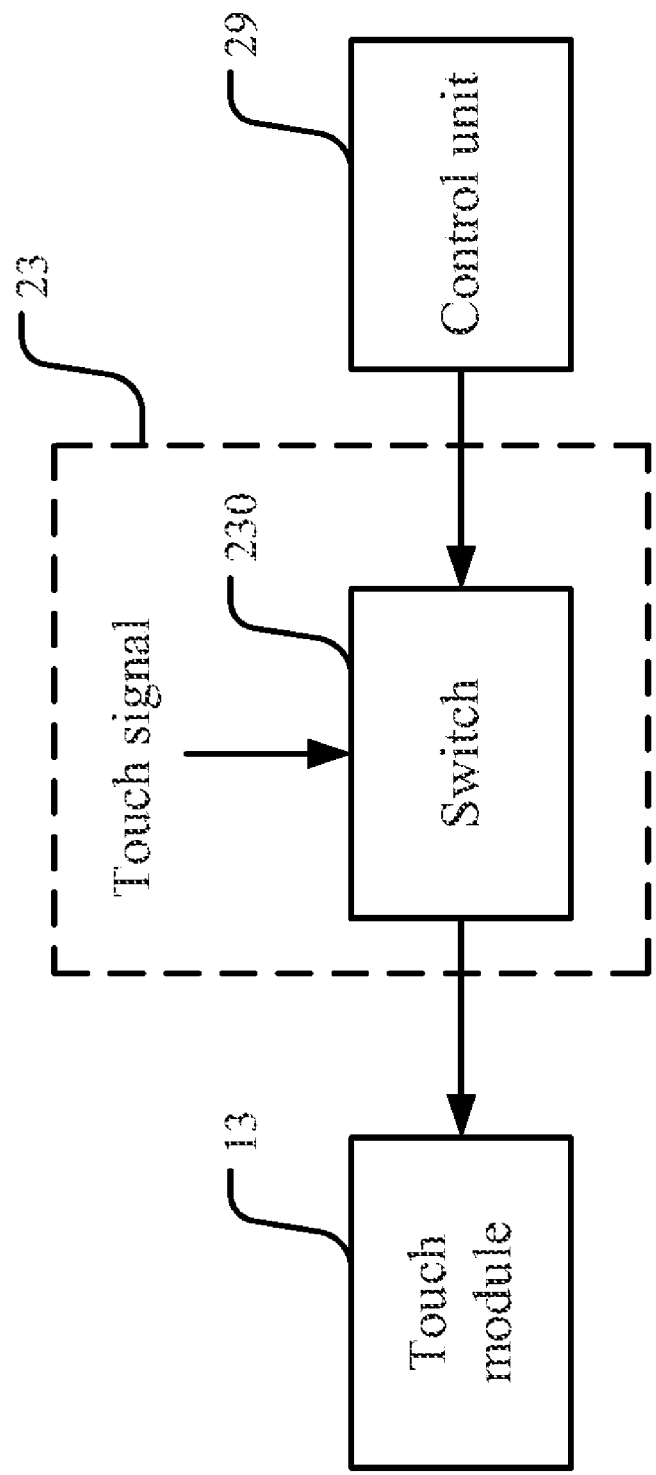
FIG. 8 shows a block diagram of touch testing according to a preferred embodiment of the present invention.

FIG. 8 shows a block diagram of touch testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the touch testing circuit 23 of the testing module 20 to test the touch module 13. The touch testing circuit 23 has a switch 230 coupled between the touch module 13 of the plurality of the functional modules and a touch signal. The touch testing circuit 23 closes the switch 230 according to the control signal produced by the control unit 29 for outputting the touch signal to the touch module 13 and performing touch testing. In other words, the touch testing circuit 23 according to the present invention outputs the touch signal to the touch module 13 by closing the switch 230 for replacing manual testing. Thereby, the personnel cost can be reduced and man-made errors can be avoided as well. Moreover, the switch 230 is a relay or a transistor.

Figure 9:
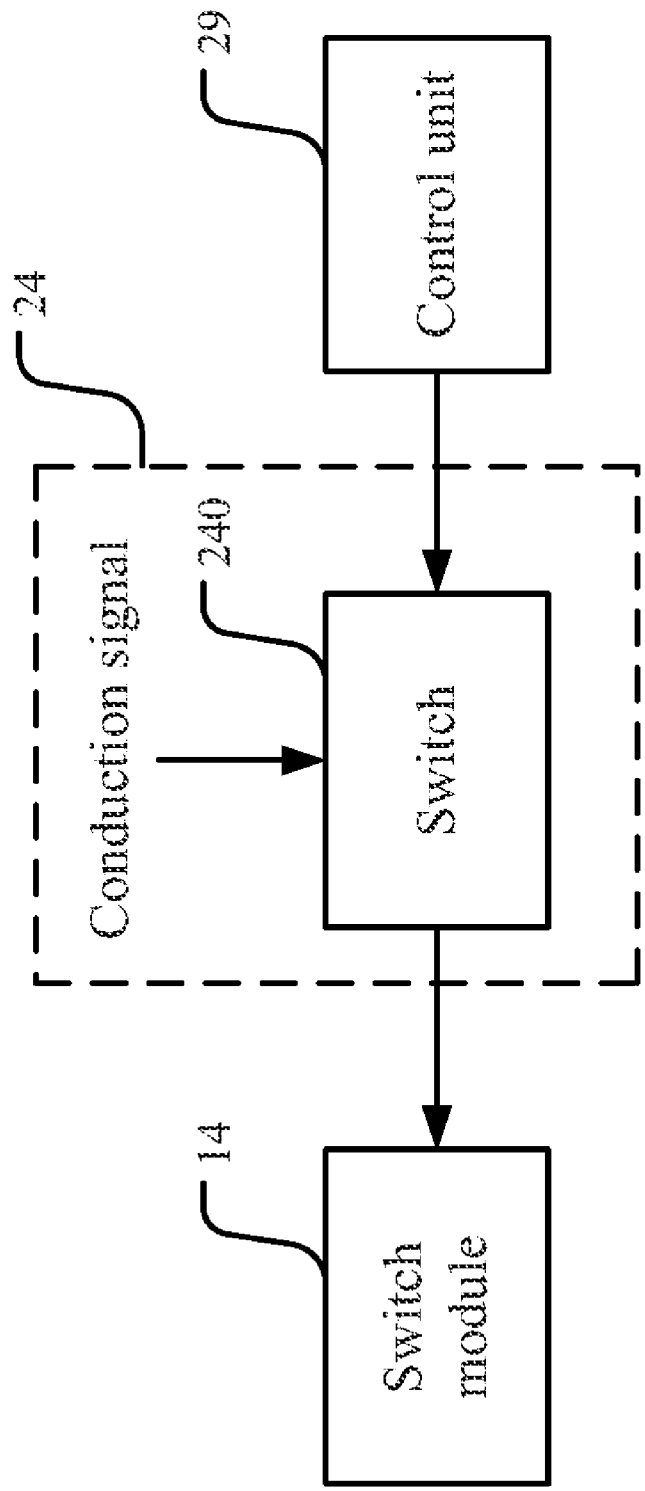
FIG. 9 shows a block diagram of switch module testing according to a preferred embodiment of the present invention.

FIG. 9 shows a block diagram of switch module testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the switch testing circuit 24 of the testing module 20 to test the switch module 14. The switch testing circuit 24 has a switch 240 coupled between the switch module 14 of the plurality of the functional modules and a conduction signal. The switch testing circuit 24 closes the switch 240 according to the control signal produced by the control unit 29 for outputting the conduction signal and testing the switch module 14. In other words, according to the present invention, the conduction signal is transmitted to the switch module 14 by closing the switch 240 for replacing manual testing. Thereby, the personnel cost can be reduced and man-made errors can be avoided as well. Moreover, the switch module 14 is a switch for image output module, a network management switch, or a wireless network switch. Besides, the switch 240 is a relay or a transistor.

Figure 10:
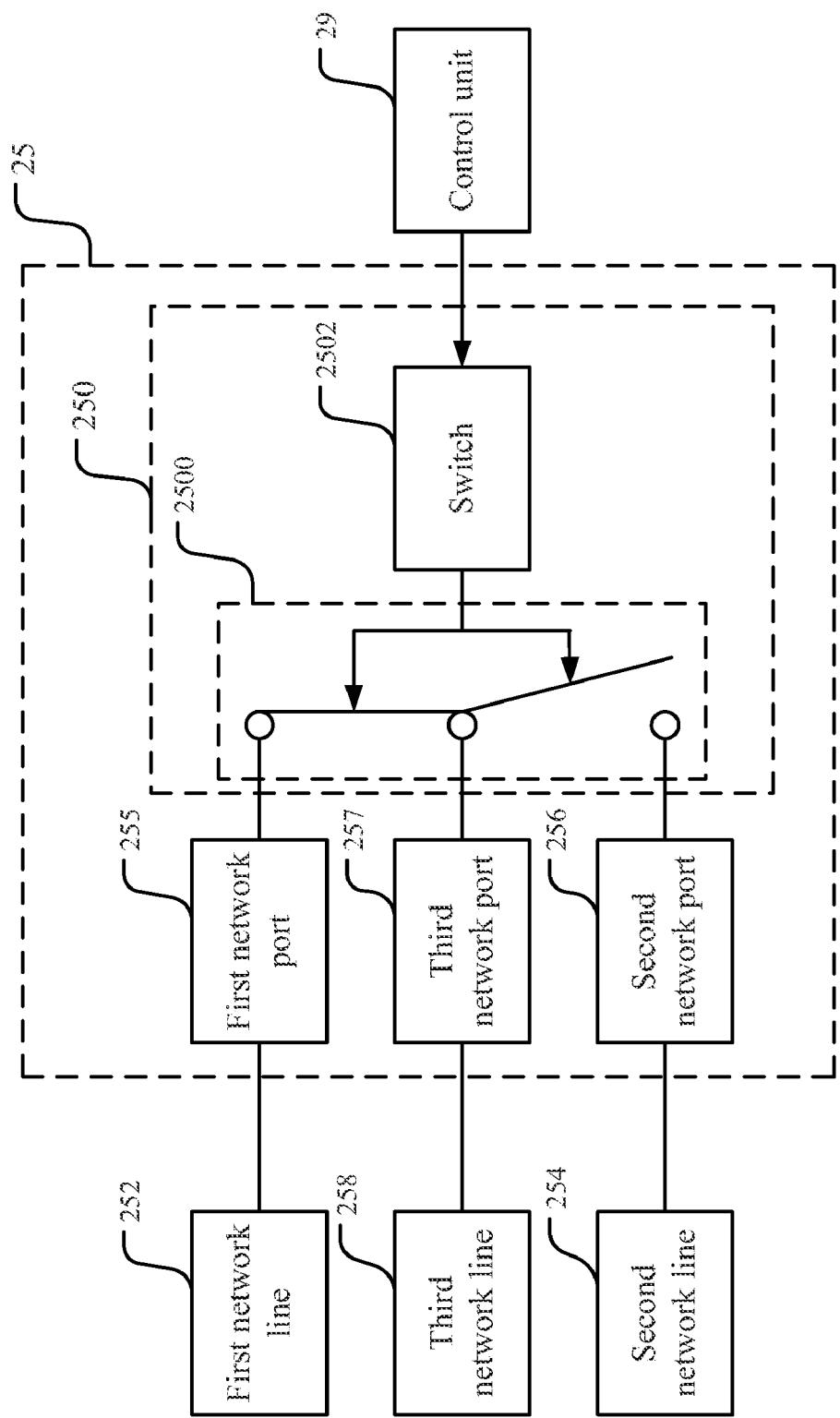
FIG. 10 shows a block diagram of network line testing according to a preferred embodiment of the present invention.

FIG. 10 shows a block diagram of network line testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the network line testing circuit 25 of the testing module 20 to switch network lines for testing network lines, respectively. The network line testing circuit 25 has a switching module 250, which is closed/opened by the network line testing circuit 25 in accordance with the control signal for switching to a first network line 252 or a second network line 254 of the plurality of functional modules and for testing the network lines. Thereby, according to the present invention, testing is performed by switching to the first network line 252 or the second network line 254 by using the switching module 250 for replacing manual switching of network line during testing. Hence, the personnel cost can be reduced and man-made errors can be avoided as well.

The network line testing circuit 25 includes a first network port 155, a second network port 256, a third network port 257, and the switching module 250. The first network port 255 is coupled to the network line testing circuit 25 via the first network line 252; the second network port 256 is coupled to the network line testing circuit 25 via the second network line 254; and the third network port 257 is coupled to the device under test 10 via a third network line 258. The switching module 250 is coupled to the first, second, and third network ports 255, 256, 256, and switches to the first or second network line 252, 254 for performing network line testing. The first or second network line 252, 254 is a LAN 50M network line or a LAN LOOP network line. The switching module 250 is a relay, a transistor, or an arbitrary combination of the two.

Furthermore, the switching module 250 includes a relay 2500 and a switch 2502. The relay 2500 is coupled to the first, second, and third network ports 255, 256, 257; the switch 2502 is coupled to the relay 2500. The switch 2502 closes to conduct the first and third network ports 255, 257 according to the control signal, or to conduct the second and third network ports 256, 257 so that the first or the second network line 252, 254 communicates with the device under test 10. Thereby, the first network line 252 or the second network line 254 can be switched to for testing. According to the present preferred embodiment, although a relay 2500 is used for switching between the first network line 252 and the second network line 254, the number of relay 2500 is not limited to one. Alternatively, a plurality of relays can be used for achieving the switching objective.

Figure 11:
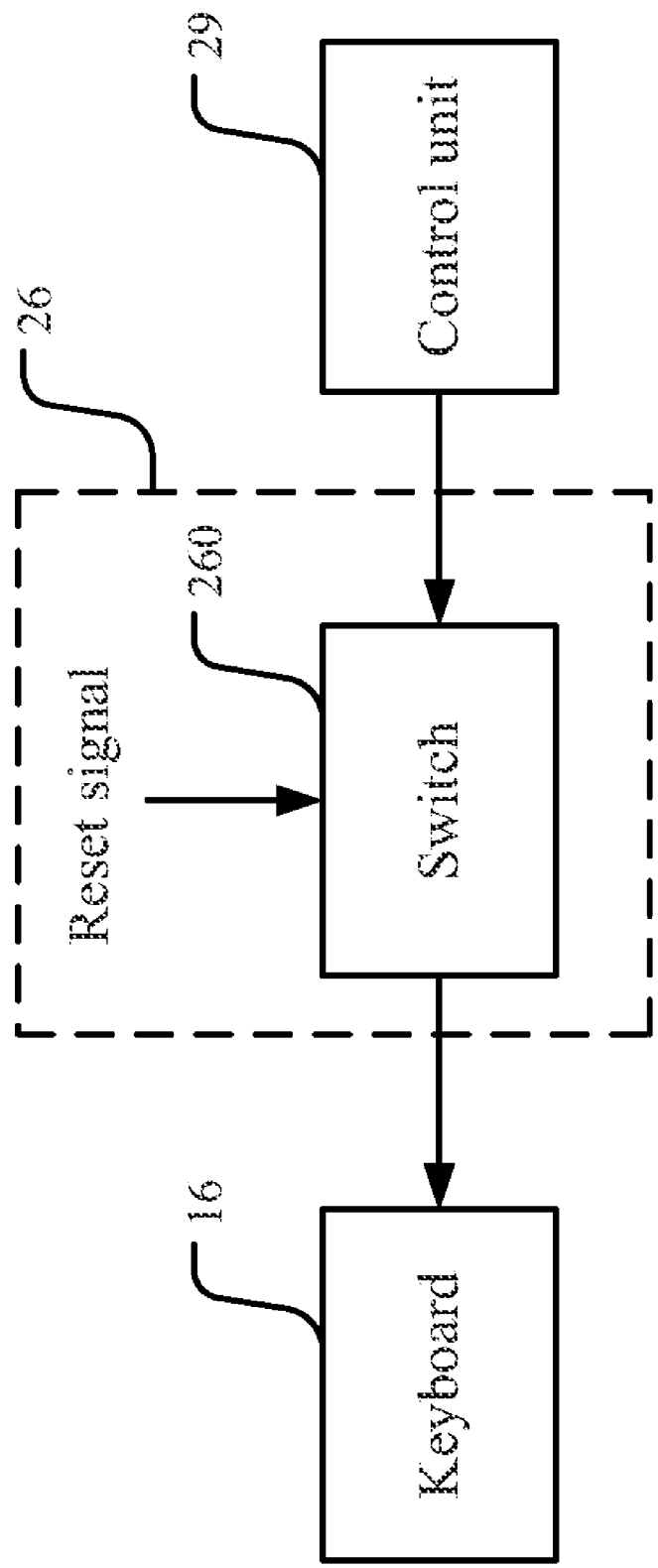
FIG. 11 shows a block diagram of keyboard testing according to a preferred embodiment of the present invention.

FIG. 11 shows a block diagram of keyboard testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the keyboard testing circuit 26 of the testing module 20 to reset the keyboard 16 of the device under test 10. The keyboard testing circuit 26 has a switch 260, which is closed by the keyboard testing circuit 26 in according with the control signal for resetting the keyboard 16 of the device under test 10. Thereby, manual resetting of the keyboard 16 is replaced and thus the personnel cost can be reduced. Moreover, the switch 260 is a relay or a transistor.

Figure 12:
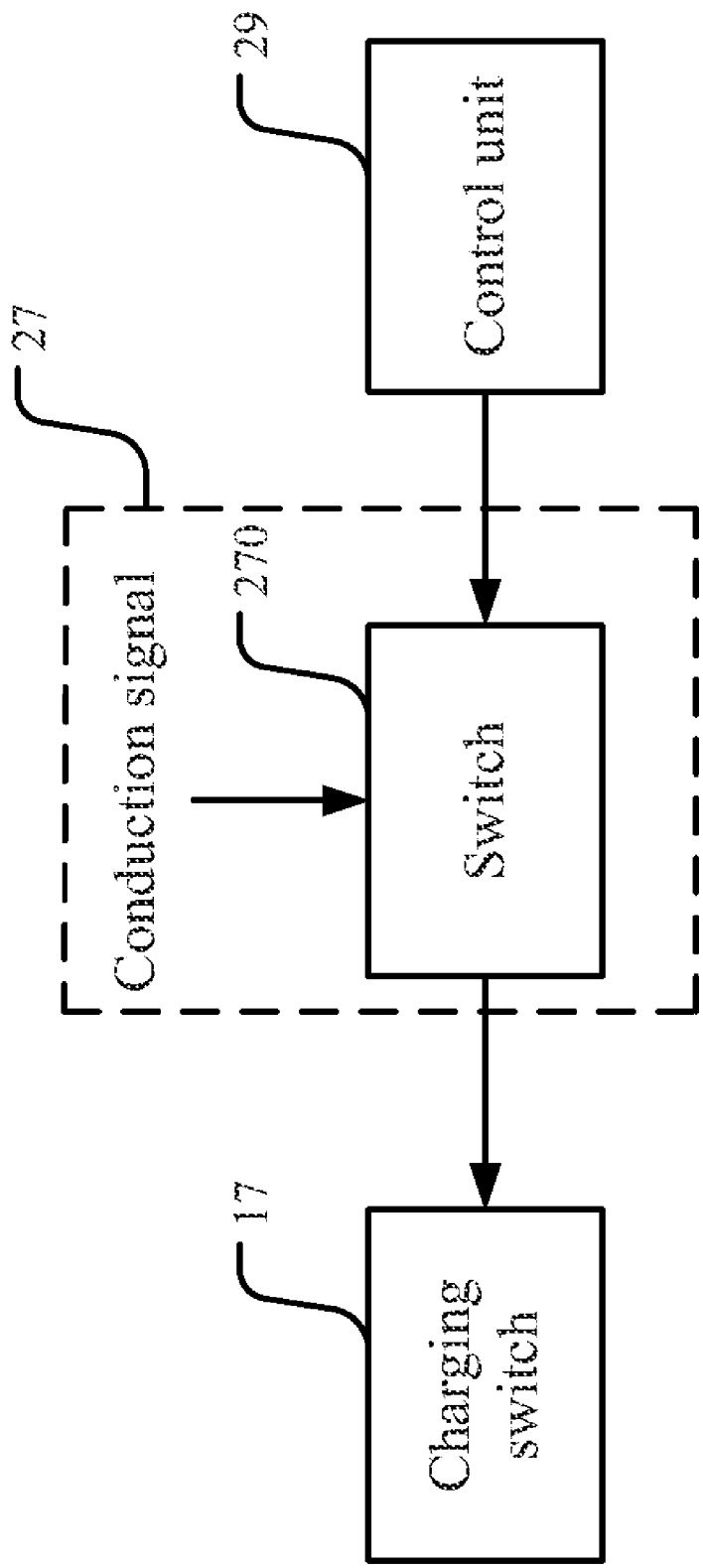
FIG. 12 shows a block diagram of charging function testing according to a preferred embodiment of the present invention.

FIG. 12 shows a block diagram of charging function testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the charge/discharge testing circuit 27 of the testing module 20 to perform charging function testing on the charging switch 17 of the device under test 10. The charge/discharge circuit 27 has a switch 270, which is closed by the charge/discharge testing circuit 27 according to the control signal for testing the charging function of the functional modules. Namely, by closing/opening the switch 270, manual plugging/unplugging of a power converter to/from the device under test 10 can be replaced. Thereby, the personnel cost can be reduced and man-made errors can be avoided as well. Moreover, the switch 270 is a relay or a transistor.

Figure 13:
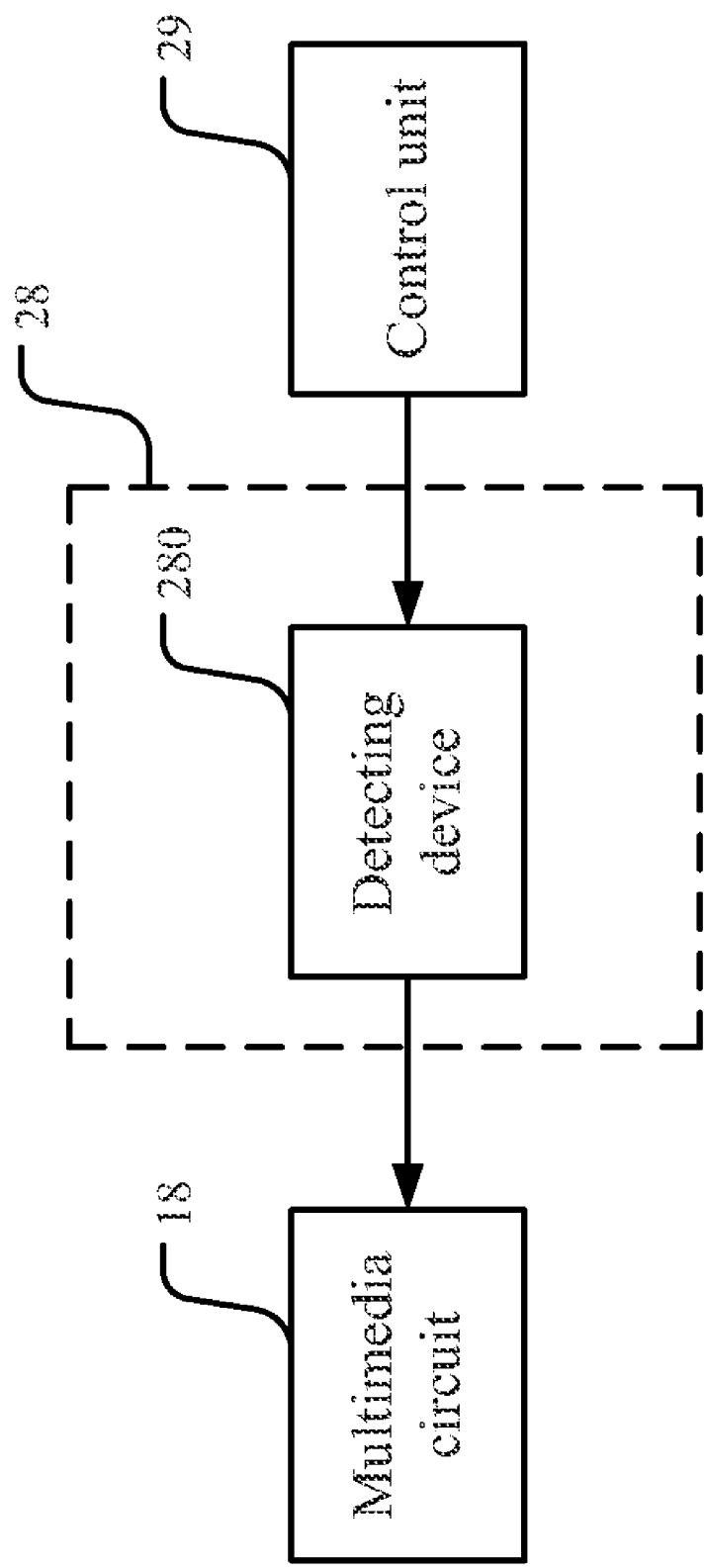
FIG. 13 shows a block diagram of multimedia testing according to a preferred embodiment of the present invention.

FIG. 13 shows a block diagram of multimedia testing according to a preferred embodiment of the present invention. As shown in the figure, the difference between the present preferred embodiment and the previous one is that, according to the present preferred embodiment, the control unit 29 receives the testing signal produced by the device under test 10 while the device under test 10 executing the testing program, and produces the control signal to drive the multimedia testing circuit 28 of the testing module 20 to perform multimedia testing on the multimedia circuit 18 of the functional modules of the device under test 10. The multimedia testing circuit 28 has a detecting device 280, which detects a light source of the multimedia circuit 28 of the functional modules according to the control signal for performing multimedia testing and for replacing manual testing by touching the sensing buttons using fingers. Thus, the personnel cost can be reduced and man-made errors can be avoided as well. Moreover, the detecting device 280 is a photosensitive resistor.

To sum up, the automatic testing apparatus according to the present invention couples to a device under test via a testing module. The device under test executes a testing program and communicates with the testing module so that the testing module can test a plurality of functional modules of the device under test. By adopting automatic testing, no tester is needed for performing testing. Thereby, the personnel cost can be reduced and the total testing time can be shortened.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An automatic testing apparatus, comprising:
a device under test, having a testing program, and including a plurality of functional modules; and
a testing module, coupled to said device under test, and testing said plurality of functional modules of said device under test;
wherein said device under test executes said testing program and communicates with said testing module, which tests said plurality of functional modules of said device under test, said testing module includes:
a control unit, receiving a testing signal produced by said device under test while said device under test executing said testing program, and producing a control signal; and
an audio testing circuit, receiving said control signal and producing a sound signal, a play unit of said plurality of functional modules playing said sound signal, and said audio testing circuit testing said sound signal played by said play unit, said audio testing circuit includes a compare module, comparing a threshold value and said sound signal played by said play unit for performing audio testing, said compare module includes:
a first extraction circuit, extracting an alternating-current signal of said sound signal;
a first compare circuit, receiving said alternating-current signal, comparing said alternating-current signal and an alternating-current threshold value of said threshold value, and producing a first compare signal;
a second extraction circuit, extracting a direct-current signal of said sound signal; and
a second compare circuit, receiving said direct-current signal, comparing said direct-current signal and a direct-current threshold value of said threshold value, and producing a second compare signal;
wherein said compare module produces an output signal according to said first compare signal and said second compare signal for judging if said play unit operates normally.

2. The automatic testing apparatus of claim 1, wherein a microphone of said plurality of functional modules receives and transmits said sound signal to said play unit for playing said sound signal to said audio testing circuit for performing audio testing.

3. The automatic testing apparatus of claim 1, wherein said output signal is transmitted to said device under test for said device under test to judge if said play unit operates normally.

4. The automatic testing apparatus of claim 1, wherein said compare module further includes a rectifying and filtering circuit, rectifying and filtering said output signal.

5. The automatic testing apparatus of claim 1, wherein said play unit is a speaker.

6. The automatic testing apparatus of claim 1, wherein said testing module includes:
a control unit, receiving a testing signal produced by said device under test while said device under test executing said testing program, and producing a control signal; and
an audio testing circuit, receiving said control signal and producing a sound signal, a microphone of said plurality of functional modules receiving said sound signal, and said audio testing circuit testing said sound signal received by said microphone.

7. The automatic testing apparatus of claim 1, wherein said testing module includes:
a control unit, receiving a testing signal produced by said device under test while said device under test executing said testing program, and producing a control signal; and
a display testing circuit, receiving said control signal and testing an image output module of said device under test, said image output module producing an image signal for said display testing circuit for performing image testing.

8. The automatic testing apparatus of claim 7, wherein said display testing circuit includes a compare module, receiving said image signal, comparing a threshold value and said image signal, and producing an output signal for judging if the image output module operates normally.

9. The automatic testing apparatus of claim 8, wherein said output signal is transmitted to said device under test for said device under test to judge if the image output module operates normally.

10. The automatic testing apparatus of claim 8, wherein said display testing module further includes a rectifying and filtering circuit, rectifying and filtering said output signal.

11. The automatic testing apparatus of claim 7, wherein said image signal includes:
a red image signal;
a green image signal; and
a blue image signal.

12. The automatic testing apparatus of claim 1, wherein said testing module includes:
a control unit, receiving a testing signal produced by said device under test while said device under test executing said testing program, and producing a control signal; and
a touch testing circuit, having a switch coupled between a touch module of said plurality of functional modules and a touch signal, said touch testing circuit closing said switch according to said control signal for outputting said touch signal to said touch module for performing touch testing.

13. The automatic testing apparatus of claim 12, wherein said switch is a relay or a transistor.

14. The automatic testing apparatus of claim 1, wherein said testing module includes:
a control unit, receiving a testing signal produced by said device under test while said device under test executing said testing program, and producing a control signal; and
a switch testing circuit, having a switch coupled between a switch module of said plurality of functional modules and a testing signal, said switch testing circuit closing said switch according to said control signal for outputting said testing signal for performing switch testing.

15. The automatic testing apparatus of claim 14, wherein said switch is a relay or a transistor.

16. The automatic testing apparatus of claim 14, wherein said switch module is a display switch, a network management switch, or a wireless network switch.

17. The automatic testing apparatus of claim 1, wherein said testing module includes:
a control unit, receiving a testing signal produced by said device under test while said device under test executing said testing program, and producing a control signal; and
a network line testing circuit, having a switching module, and said network line testing circuit closing or opening said switching module according to said control signal for switching to a first network line or a second network line of said functional modules for performing network testing.

18. The automatic testing apparatus of claim 17, wherein said network line testing circuit includes:
a first network port, coupled to said testing circuit;
a second network port, coupled to said testing circuit; and
a third network port, coupled to said device under test;
wherein said switching module is coupled to said first, second, and third network ports, and switches to said first network port or said second network port according to said control signal for performing network line testing.

19. The automatic testing apparatus of claim 17, wherein said switching module is a relay, a transistor, or an arbitrary combination of said two.

20. The automatic testing apparatus of claim 1, wherein said testing module includes:
a control unit, receiving a testing signal produced by said device under test while said device under test executing said testing program, and producing a control signal; and
a keyboard testing circuit, having a switch, and closing said switch according to said control signal for resetting a keyboard of said device under test.

21. The automatic testing apparatus of claim 20, wherein said switch is a relay or a transistor.

22. The automatic testing apparatus of claim 1, wherein said testing module includes:
a control unit, receiving a testing signal produced by said device under test while said device under test executing said testing program, and producing a control signal; and
a charge/discharge testing circuit, having a switch, and closing said switch according to said control signal for testing the charging function of said functional modules.

23. The automatic testing apparatus of claim 22, wherein said switch is a relay or a transistor.

24. The automatic testing apparatus of claim 1, wherein said testing module includes:
a control unit, receiving a testing signal produced by said device under test while said device under test executing said testing program, and producing a control signal; and
a multimedia testing circuit, having a detecting device, said detecting device detecting a light source of a multimedia circuit of said functional modules according to said control signal for performing multimedia testing.

25. The automatic testing apparatus of claim 24, wherein said detecting device is a photosensitive resistor.

26. An automatic testing apparatus, comprising:
a device under test, having a testing program, and including a plurality of functional modules;
a control unit, receiving a testing signal produced by said device under test while said device under test executing said testing program, and producing a control signal; and
an audio testing circuit, receiving said control signal and producing a sound signal, a play unit of said plurality of functional modules playing said sound signal, and said audio testing circuit testing said sound signal played by said play unit, said audio testing circuit includes a compare module, comparing a threshold value and said sound signal played by said play unit for performing audio testing, said compare module includes:
a first extraction circuit, extracting an alternating-current signal of said sound signal;
a first compare circuit, receiving said alternating-current signal, comparing said alternating-current signal and an alternating-current threshold value of said threshold value, and producing a first compare signal;
a second extraction circuit, extracting a direct-current signal of said sound signal; and
a second compare circuit, receiving said direct-current signal, comparing said direct-current signal and a direct-current threshold value of said threshold value, and producing a second compare signal;
wherein said compare module produces an output signal according to said first compare signal and said second compare signal for judging if said play unit operates normally.

27. The automatic testing apparatus of claim 26, wherein a microphone of said plurality of functional modules receives and transmits said sound signal to said play unit for playing said sound signal to said audio testing circuit for performing audio testing.

28. The automatic testing apparatus of claim 26, wherein said output signal is transmitted to said device under test for said device under test to judge if said play unit operates normally.

29. The automatic testing apparatus of claim 26, wherein said compare module further includes a rectifying and filtering circuit, rectifying and filtering said output signal.

30. The automatic testing apparatus of claim 26, wherein said play unit is a speaker.

31. The automatic testing apparatus of claim 26, wherein said control unit is further coupled to a display testing circuit, which receives said control signal and tests an image output module of said device under test, and said image output module produces an image signal for said display testing circuit for performing image testing.

32. The automatic testing apparatus of claim 31, wherein said display testing circuit includes a compare module, receiving said image signal, comparing a threshold value and said image signal, and producing an output signal for judging if the image output module operates normally.

33. The automatic testing apparatus of claim 32, wherein said output signal is transmitted to said device under test for said device under test to judge if the image output module operates normally.

34. The automatic testing apparatus of claim 31, wherein said display testing module further includes a rectifying and filtering circuit, rectifying and filtering said output signal.

35. The automatic testing apparatus of claim 31, wherein said image signal includes:
   a red image signal;
   a green image signal; and
   a blue image signal.

36. The automatic testing apparatus of claim 26, wherein said control unit is further coupled to a network line testing circuit, which has a switching module, and closes or opens said switching module according to said control signal for switching to a first network line or a second network line of said functional modules for performing network testing.

37. The automatic testing apparatus of claim 36, wherein said network line testing circuit includes:
   a first network port, coupled to said testing circuit;
   a second network port, coupled to said testing circuit; and
   a third network port, coupled to said device under test;
   wherein said switching module is coupled to said first, second, and third network ports, and switches to said first network port or said second network port according to said control signal for performing network line testing.

38. The automatic testing apparatus of claim 35, wherein said switching module is a relay, a transistor, or an arbitrary combination of said two.

\* \* \* \* \*